United States Patent [19]

Leonard et al.

[11] Patent Number: 5,705,743

[45] Date of Patent: Jan. 6, 1998

[54] METHOD FOR IDENTIFYING PARAMETER IDENTIFIERS OF A MOTOR VEHICLE

[75] Inventors: Michael David Leonard, Sterling Heights; Jeffrey Allen Kay, Shelby Township, both of Mich.

[73] Assignee: Ford Global Technologies, Inc., Dearborn, Mich.

[21] Appl. No.: 748,079

[22] Filed: Nov. 13, 1996

[51] Int. Cl.⁶ .................................................. G01M 15/00
[52] U.S. Cl. .......................... 73/116; 73/117.2; 73/117.3; 364/431.03; 364/431.04; 364/551.01
[58] Field of Search .......................... 73/116, 117.2, 73/117.3, 118.1; 340/439; 364/431.01, 431.03, 551.01, 431.04

[56] References Cited

U.S. PATENT DOCUMENTS

| | | | |
|---|---|---|---|
| 4,402,217 | 9/1983 | Higashiyama | 73/117.3 |
| 4,404,639 | 9/1983 | McGuire et al. | 364/551.01 |
| 4,924,391 | 5/1990 | Hirano et al. | 73/117.3 |
| 4,926,352 | 5/1990 | Staffe | 364/431.01 |
| 5,056,023 | 10/1991 | Abe | 73/117.3 |
| 5,077,670 | 12/1991 | Takai et al. | 73/117.3 |
| 5,446,665 | 8/1995 | Adrian et al. | 364/431.01 |
| 5,491,631 | 2/1996 | Shirane et al. | 73/118.1 |

*Primary Examiner*—George M. Dombroske
*Attorney, Agent, or Firm*—Peter Abolins, Esq.; Roger L. May, Esq.

[57] ABSTRACT

A method for identifying each of a plurality of parameter identifiers in a motor vehicle having a diagnostic test port using a diagnostic test tool is disclosed wherein the method includes the steps of plugging the diagnostic test tool into the diagnostic test port of the motor vehicle, receiving identification information from one of the plurality of parameter identifiers, determining whether the identification information from the one of the plurality of parameter identifiers is valid, and storing the identification information in a tailored list to be used to address the one of the plurality of parameter identifiers to retrieve data collected thereby.

6 Claims, 2 Drawing Sheets

METHOD FOR IDENTIFYING PARAMETER IDENTIFIERS OF A MOTOR VEHICLE

BACKGROUND OF THE INVENTION

1. Field of the Invention

The present invention relates to a method for identifying parameter identifiers and, more particularly, the present invention relates to a method for listing all parameter identifiers in a motor vehicle.

2. Description of the Related Art

Parameter identifiers have been used in motor vehicles to transmit raw data from remote locations within the motor vehicle to a control module such as a powertrain control module or an electronic engine control module. The raw data from the parameter identifiers may come from such devices as a fuel pump, a spark advancement detection device, an engine coolant temperature sensor, and the like. This data, once received by the control module, can be downloaded by a technician to determine which portion of a motor vehicle may require maintenance.

By way of example, a motor vehicle may be plagued with a continuous fast idle speed. Retrieving raw data from a parameter identifier corresponding to the engine coolant temperature may show that the temperature of the engine coolant to be a constant 30° F. This constant low temperature could be caused by an improperly operating thermostat. Replacement of the thermostat may return the idle to a proper low speed and identification of the temperature problem obviated the need for extensive testing and unnecessary repairs.

The parameter identifiers available on each motor vehicle varies greatly. Depending on the equipment available in the motor vehicle, a motor vehicle may have several parameter identifiers. Other motor vehicles may have over one hundred parameter identifiers. A problem exists for repair technicians because there currently is no method for identifying which parameter identifiers are found on a particular motor vehicle. Therefore, a repair technician must go through each potential parameter identifier to find the parameter identifiers which are responding to the request for raw data. This is a tedious, time consuming task which may result in an incorrect diagnosis of a particular problem due to the potential misreading of a value given by a diagnostic tool which does not read or acknowledge the existence of a particular parameter identifier. Therefore, there is a need in the art to identify which parameter identifiers are incorporated into a particular motor vehicle to create a list to be reviewed by the repair technician and to remove all non-existing parameter identifiers from a viewing list when such parameter identifiers do not exist for that particular motor vehicle.

SUMMARY OF THE INVENTION

Accordingly, a method for identifying each of a plurality of parameter identifiers in a motor vehicle is disclosed. The motor vehicle includes a diagnostic test port and the method utilizes the use of a diagnostic test tool. The method includes the step of plugging the diagnostic test tool into the diagnostic test port of the motor vehicle. The method also includes the step of receiving identification information from one of the plurality of parameter identifiers. The method includes the step of determining whether the identification information from one of the plurality of parameter identifiers is valid. The method further includes the step of storing the identification information in a tailored list to be used to address the one of the plurality of parameter identifiers to retrieve data collected thereby.

One advantage associated with the present invention is the ability to identify the parameter identifiers utilized by a motor vehicle. Another advantage associated with the present invention is the ability to list all of the parameter identifiers utilized by a motor vehicle in succession to the exclusion of non-existing parameter identifiers. Yet another advantage associated with the present invention is the ability to identify whether a particular parameter identifier is operating correctly.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
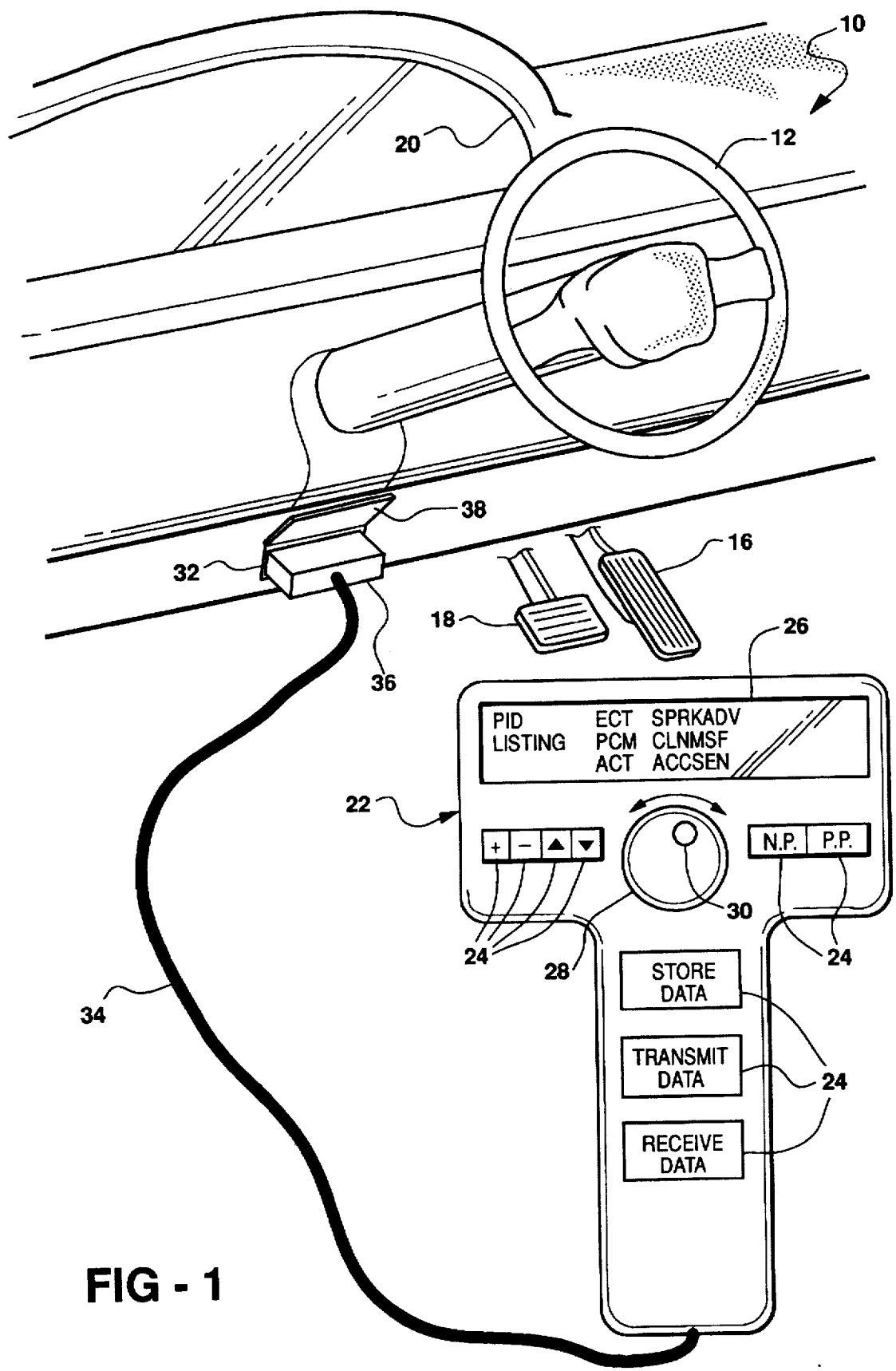
FIG. 1 is a perspective view of a diagnostic test tool connected to a motor vehicle.

Referring to FIG. 1, a portion of motor vehicle controls are generally indicated at 10. The motor vehicle controls 10 include a steering wheel 12 connected to the motor vehicle through a steering column 14, an acceleration pedal 16, a brake pedal 18 and a portion of an instrument cluster 20. These motor vehicle controls 10 are standard and known in the art to be utilized by a driver of a motor vehicle (not shown) during the operation thereof.

A diagnostic test tool is generally shown at 22. The diagnostic test tool 22 includes a plurality of control buttons 24 which are used to operate the diagnostic test tool 22. The diagnostic test tool 22 also includes a display 26. In one embodiment, the display 26 is an LCD display. The display 26 is designed to list information in column and row form. It may be appreciated by those skilled in the art that other forms of displaying information may be used. A display wheel 28 is used to rapidly change the information on the display 26. The display wheel 28 includes a finger detent 30 for aiding in rotating the display wheel 28 clockwise or counterclockwise as is desired by the operator.

The diagnostic test tool 22 is electrically connected to the motor vehicle at a diagnostic test port 32. In one embodiment, the diagnostic test port 32 is below the steering column 14. The diagnostic test tool 22 is connected to the diagnostic test port 32 via an appropriate electrical conductor 34. A plug 36 extends into the diagnostic test port 32 and includes a plurality of pins (not shown) capable of transmitting data therebetween. A lid 38 is pivotal about a diagnostic test port 32 to cover the diagnostic test port 32 when it is not being used. It may be appreciated by those skilled in the art that the diagnostic test tool 22 may communicate with the motor vehicle in manners other than an electrical conductor such as the electrical conductor shown in FIG. 1. A non-exhaustive list of alternatives to using the electrical conductor 34 include an optical or magnetic sensing system.

In operation, the diagnostic test tool 22 is plugged into the diagnostic test port 32 to receive information on a plurality of parameter identifiers (not shown) which are listed in the display 26. A value (not shown) associated with each of the parameter identifiers is listed alongside the parameter identifier listing. The control buttons 24 and the display wheel 28 allow an operator to view and manipulate data as desired.

Upon completion of the review, the plug 36 is disconnected from the diagnostic test port 32 and the lid 38 is pivoted back over the diagnostic test port 32. The data recovered is used to identify problems which may exist and to subsequently maintenance the motor vehicle based on the identified problems.

Figure 2:
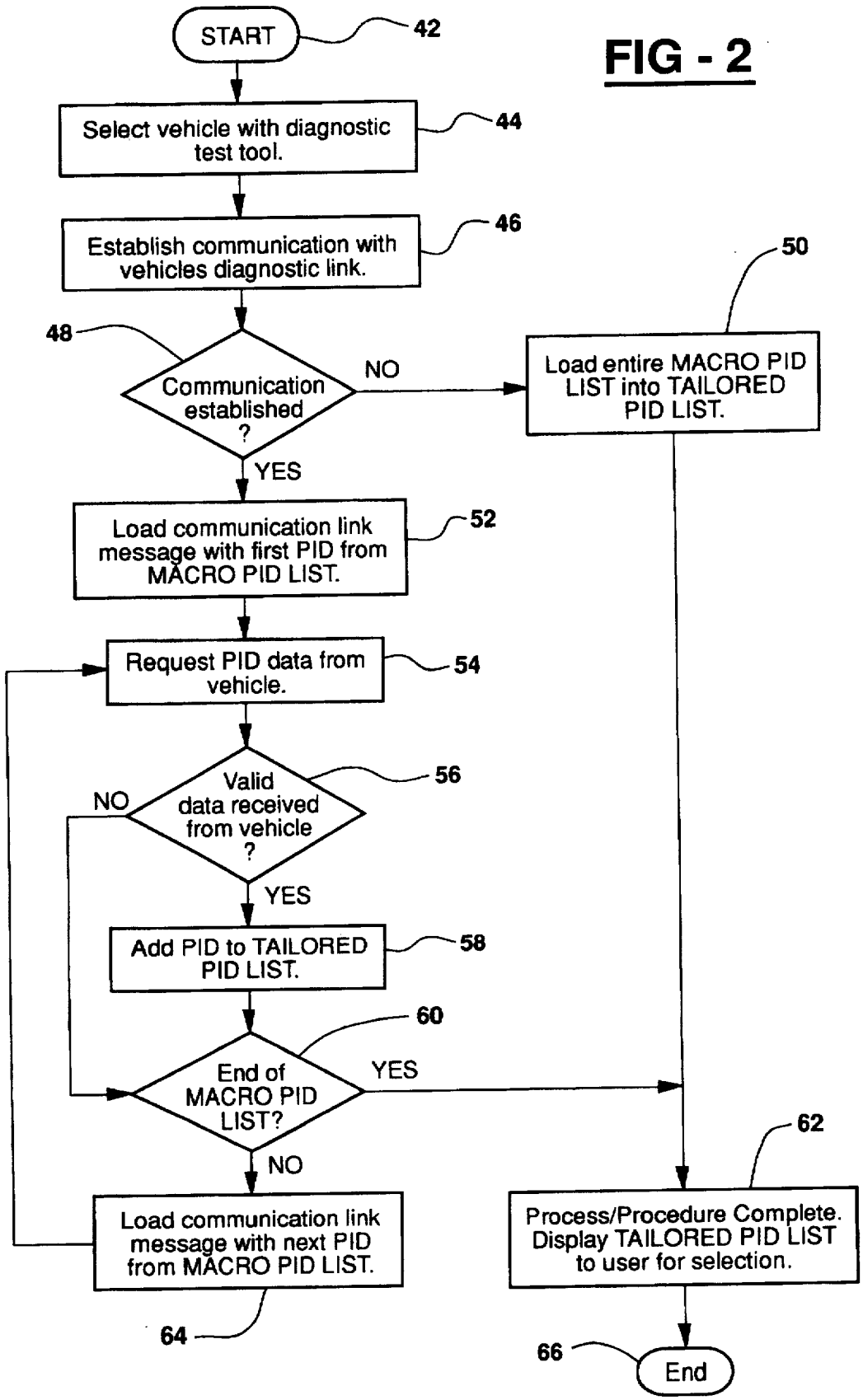
FIG. 2 is a flow chart of one embodiment of a method according to the present invention.

Referring to FIG. 2, a method according to the present invention is generally indicated at 40. The method begins at 42. Once the diagnostic test tool 22 is connected to the diagnostic test port 32, a vehicle type is selected at 44. This may be done manually or, in the alternative, automatically through a vehicle identification parameter scheme. Once the type of vehicle has been identified, the method for identifying each of a plurality of parameter identifiers in the motor vehicle may be accomplished. The method includes the step of establishing a communication link with the vehicle at 46. It is then determined whether the communication has been established at 48. Communication is established by receiving identification information from one of the plurality of parameter identifiers. If communication cannot be established, the entire parameter identifier list (MACRO PID LIST) is entered into a tailored list at 50. Because communication could not be established, the diagnostic test tool 22 downloads the MACRO PID LIST so that the diagnostic test tool 22 does not miss a single parameter identifier and must go through each parameter identifier to read the value, if any, associated therewith.

If, however, communication has been established, a communication link message with the parameter identifier is loaded into the diagnostic test tool 22 at 52. The data from the parameter identifier is requested at 54. A test is performed to determine whether the data received from the vehicle, and more particularly, the individual parameter identifier, is valid at 56. This data for the particular parameter identifier is stored in a tailored list compiled to be used to address all the plurality of parameter identifiers to retrieve valid data collected thereby at 58. A test is performed to determine whether the diagnostic test tool 22 has gone through the entire parameter identification list, i.e., the MACRO PID LIST, at 60. This test is also performed after the parameter identifier with valid data is stored in the tailored list. If the end of the MACRO PID LIST have been reached, the tailored list is displayed to be used by the operator at 62. If not, a communications link message is loaded into the diagnostic test tool 22 to view the next parameter identifier from the MACRO PID LIST at 64. From that point, data from the next parameter identifier is requested at 56 after which a determination of its validity is made as discussed above.

Once the tailored list has been completed and displayed in the display 26 of the diagnostic test tool 22, the method is terminated at 66. The tailored list can be substantially smaller than the MACRO PID LIST, depending on the number of parameter identifiers utilized by the particular vehicle being tested. This reduction in information which must be reviewed by the operator enhances the operator's ability to diagnose and maintenance the motor vehicle in a shorter amount of time.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for identifying each of a plurality of parameter identifiers in a motor vehicle having a diagnostic test port using a diagnostic test tool, the method comprising the steps of:

plugging the diagnostic test tool into the diagnostic test port of the motor vehicle;

receiving identification information from one of the plurality of parameter identifiers;

determining whether the identification information from the one of the plurality of parameter identifiers is valid;

identifying an invalid response when the identification information is not valid; and storing the identification information in a tailored list to be used to address the one of the plurality of parameter identifiers to retrieve data collected thereby.

2. A method as set forth in claim 1 including the step of storing the identification information in the tailored list of each of the plurality of parameter identifiers when the step of receiving identification information is not established.

3. A method as set forth in claim 1 including the step of receiving identification information from another of the plurality of parameter identifiers.

4. A method as set forth in claim 3 including the step of displaying all of the plurality of parameter identifiers in the tailored list.

5. A method for identifying each of a plurality of parameter identifiers in a motor vehicle having a diagnostic test port using a diagnostic test tool, the method comprising the steps of:

plugging the diagnostic test tool into a diagnostic test port of the motor vehicle;

receiving identification information from one of the plurality of parameter identifiers;

determining whether the identification information from the one of the plurality of parameter identifiers is valid;

identifying an invalid response when the identification information is not valid;

storing the identification information in a tailored list to be used to address the one of the plurality of parameter identifiers to retrieve data collected thereby;

receiving information from another of the plurality of parameter identifiers to determine whether the identification information received from another plurality of parameter identifiers is valid; and displaying all of the plurality of parameter identifiers in the tailored list.

6. A method for identifying each of a plurality of parameter identifiers in a motor vehicle having a diagnostic test port using a diagnostic test tool, the method comprising the steps of:

establishing a communication between the diagnostic test tool and the diagnostic test port of the motor vehicle;

receiving identification information from one of the plurality of parameter identifiers;

determining whether the identification information from one of the plurality of parameter identifiers is valid;

identifying an invalid response when the identification information is not valid; and storing the identification information of the one of the plurality of parameter identifiers when the identification information is valid in a tailored list to be used to address one of the plurality of parameter identifiers to retrieve data collected thereby.

* * * * *